(12) United States Patent
Gauthier et al.

(10) Patent No.: US 7,965,684 B2
(45) Date of Patent: Jun. 21, 2011

(54) METHOD AND SYSTEM OF HANDOFF

(75) Inventors: Dominique Gauthier, Laval (CA); Martin Lanoue, St-Jean-sur-Richelieu (CA)

(73) Assignee: Bell Mobility Inc., Montreal, Quebec (CA)

(*) Notice: Subject to any disclaimer, the term of this patent is extended or adjusted under 35 U.S.C. 154(b) by 2307 days.

(21) Appl. No.: 10/644,932

(22) Filed: Aug. 21, 2003

(65) Prior Publication Data
US 2005/0041621 A1 Feb. 24, 2005

(51) Int. Cl.
*H04Q 7/00* (2006.01)
(52) U.S. Cl. .................. 370/331; 455/442
(58) Field of Classification Search .......... 370/329, 370/331; 455/436–445, 552.1, 553.1
See application file for complete search history.

(56) References Cited

U.S. PATENT DOCUMENTS

| | | | |
|---|---|---|---|
| 5,513,246 A * | 4/1996 | Jonsson et al. | 455/443 |
| 5,594,718 A | 1/1997 | Weaver et al. | |
| 6,035,212 A | 3/2000 | Rostoker et al. | |
| 6,070,075 A | 5/2000 | Kim | |
| 6,078,571 A | 6/2000 | Hall | |
| 6,353,742 B1 * | 3/2002 | Bach | 455/453 |
| 6,424,834 B1 | 7/2002 | Chang et al. | |
| 6,430,200 B1 * | 8/2002 | Han et al. | 370/500 |
| 6,477,154 B1 * | 11/2002 | Cheong et al. | 370/328 |
| 6,549,524 B1 | 4/2003 | Shin | |
| 6,556,551 B1 * | 4/2003 | Schwartz | 370/331 |
| 6,574,203 B2 * | 6/2003 | Bernstein et al. | 370/332 |
| 6,621,811 B1 * | 9/2003 | Chang et al. | 370/342 |
| 6,771,964 B1 * | 8/2004 | Einola et al. | 455/437 |
| 2004/0224711 A1 * | 11/2004 | Panchal et al. | 455/518 |

FOREIGN PATENT DOCUMENTS

| | | |
|---|---|---|
| CA | 2186879 | 10/1995 |
| CA | 2375159 | 11/2001 |
| CA | 2375159 A1 | 11/2001 |
| WO | PCT/CA2004/001473 | 12/2004 |

OTHER PUBLICATIONS

Office Action mailed on Dec. 1, 2010 in connection with Canadian Patent Application 2,536,314, 4 pages.

* cited by examiner

*Primary Examiner* — Seema S Rao
*Assistant Examiner* — Wanda Z Russell

(57) ABSTRACT

The present invention provides a novel method and system for effecting CDMA handoff transitions. In an embodiment, a converter is provided that converts a conventional CDMA trigger signal at a first frequency into the same handoff trigger signal but at second frequency. Where a subscriber station is operating in a coverage area at the second frequency, the received CDMA re-direction signal can be used to trigger the handoff of the subscriber station from the second frequency to the first frequency.

35 Claims, 9 Drawing Sheets

METHOD AND SYSTEM OF HANDOFF

FIELD OF THE INVENTION

The present invention relates generally to telecommunications and more particularly to a method and system of handoff in a telecommunication system.

BACKGROUND OF THE INVENTION

As is well understood by those of skill in the art, the transferring of a subscriber station from one base station to another is termed handoff. In simple terms, handoff occurs when a subscriber station has to be handed off from one cell to another as the subscriber station moves between cells. Hard handoff refers to breaking the connection in a current cell and then making a new connection in the new cell. Hard handoff is also referred to as a "break-before-make" handoff. While Code Division Multiple Access ("CDMA") offers the opportunity to perform a "make-before-break" or "soft" handoff when adjacent CDMA cells all the same frequency, situations still occur in a CDMA system when a subscriber station will transition between cells that operate on different frequencies. Thus, CDMA systems that span multiple frequencies still require equipment to effect hard handoff.

There are several known methods of effecting hard handoff. One common method is by means of a round trip delay ("RTD") trigger. In simple terms, the RTD can be used to establish a distance between the subscriber station and the corresponding base station. Where the established distance indicates that the subscriber station is at the frequency edge, hard handoff is triggered. While RTD trigger is perhaps the most common method of effecting hard handoff it is not always reliable, and thus it is also known to use a pilot beacon trigger to effect hard handoff. Typically, a pilot beacon trigger can be used in both idle and traffic mode transitions, whereas RTD is used in traffic mode transitions only. When using a pilot beacon trigger, a radio frequency signal is transmitted on a pilot channel, that forces the subscriber station to transition to another frequency. Pilot beacon triggers can be effected with a pilot beacon unit, such as the Ericsson/Qualcomm QCPlus Pilot Beacon. Unfortunately, the QCPlus Pilot Beacon has been discontinued, and so it can be difficult to readily obtain a pilot beacon unit for to effect pilot beacon triggers. One way of effecting a pilot beacon trigger hard handoff without a pilot beacon unit is to use a channel element card in the base station radio that is enabled to transmit the appropriate radio frequency signal to force the subscriber station to transition to another frequency on hard handoff. In general, either of these solutions tend to be costly in a multi-carrier environment, such as that found in an urban centre like the Greater Toronto Area in Ontario, Canada.

Another method for effecting hard handoff is using a so-called Enhanced Hard Handoff, which is a hard handoff based on forward and reverse call statistic parameters such as frame-error-rate ("FER") or a received signal to noise ratio expressed as $E_b/N_o$. However, it is believed that pilot beacon triggered HHO mechanisms have proved to be generally reliable, whereas EHHO can be difficult to implement in the field, particularly in relation to pilot beacon triggered HHO.

SUMMARY OF THE INVENTION

It is an object of the present invention to provide a novel method and system of handoff in a telecommunication system that obviates or mitigates at least one of the above-identified disadvantages of the prior art.

An aspect of the invention provides a device for use in a wireless communication system comprising an input device for receiving a handoff trigger signal at a first mode respective to a first coverage area of the communication system. The device also includes an output device for delivering the handoff signal at a second mode respective to a second coverage area. The device also includes a converter for translating the handoff trigger signal from the first mode into the second mode. The second mode handoff signal is directed to a subscriber station that is operating in the second mode at a location within both of the coverage areas. The second mode handoff signal notifies the subscriber station to switch from the second mode to the first mode so that the subscriber station operates in the first coverage area.

Typically, the device is used within a CDMA system. In this event, the first mode is typically a first frequency and the second mode is a second frequency. The device can be retrofitted into an existing base station located in the second coverage area, or into a pilot beacon trigger unit that is operating in the second mode. When retrofitted onto the existing base station, the handoff trigger signal generated by the existing base station at the second frequency is converted by the device into the same signal but now transmitted at the first frequency so it can be received by the subscriber station.

An aspect of the invention provides a device for use in a wireless communication system comprising: an input device for receiving a handoff trigger signal at a first mode respective to a first coverage area of the communication system and an output device for delivering the handoff signal at a second mode respective to a second coverage area. The device also includes a converter for translating the handoff trigger signal from the first mode into the second mode. The second mode handoff signal is for indicating to a subscriber station operating in the second mode within both of the coverage areas to switch from the second mode to the first mode so that the subscriber station operates in the first coverage area.

The first coverage area and the second coverage area of the system can be based on a protocol selected from the group consisting of CDMA, TDMA, GSM, GPRS, AMPS and FDMA.

The protocols respective to each of the coverage areas can be different, but are typically the CDMA protocol wherein the handoff trigger signal is a conventional CDMA re-direction signal, and wherein the first mode is a first frequency and the second mode is a second frequency different from the first frequency. The first coverage area and the second coverage area are typically served by respective CDMA base stations. The device can be integral with one of the base stations.

The converter of the device can comprise a down-converter operable to receive the handoff trigger signal from the input device and for converting the handoff trigger from the first frequency to an intermediate frequency. The converter also includes an up-converter for converting the intermediate frequency to the second frequency. The device can also include a microcontroller operably connected to the down-converter and the up-converter such that the first frequency and the second frequency is user-selectable. The microcontroller can be further operable to perform at least one of logging various conversions performed by the converter, and generating alarms if the converter operates outside of desired specifications.

Another aspect of the invention provides a method of generating a handoff trigger signal comprising the steps of:
receiving a trigger signal at a first mode respective to a first coverage area;
converting the trigger signal from the first mode to a second mode respective to a second coverage area; and, outputting the trigger signal into the second coverage area.

Another aspect of the invention provides a system for performing handoff comprising: a first base station operating a first mode and operable to generate a handoff trigger signal at the first mode. The system also comprises a second base station operating a second mode, and a handoff device that includes an input device for receiving the handoff trigger signal at the first mode. The handoff device also includes an output device for delivering the handoff signal at the second mode in a coverage area respective to the second base station. The handoff device also includes a converter for translating the handoff trigger signal from the first mode into the second mode. The second mode handoff signal is for indicating to a subscriber station operating in the second mode within both of the coverage areas to switch from the second mode to the first mode.

Another aspect of the invention provides a method of performing handoff of a subscriber station in a system that includes: a first base station operating a first mode and operable to generate a handoff trigger signal at the first mode; a second base station operating a second mode; a handoff device including an input device for receiving the handoff trigger signal at the first mode; an output device for delivering the handoff signal at the second mode in a coverage area respective to the base station; a converter for translating the handoff trigger signal from the first mode into the second mode The method comprises the steps of:

operating the subscriber station the second mode;
receiving, at the subscriber station, the second mode handoff signal;
switching the subscriber station from the second mode to the first mode based on the received second mode handoff signal.

Another aspect of the invention provides a handoff trigger signal delivered at a first mode within a first coverage area and receivable by a subscriber station operating at the first mode in the first coverage area, the handoff trigger signal is for indicating to the subscriber station to switch from the first mode to a second mode respective to a second coverage area, the handoff trigger signal having been generated by device operable to convert the handoff trigger signal from the second mode to the first mode.

BRIEF DESCRIPTION OF THE DRAWINGS

The present invention will now be explained, by way of example only, with reference to certain embodiments and the attached Figures in which.

DESCRIPTION OF THE INVENTION

Figure 1:
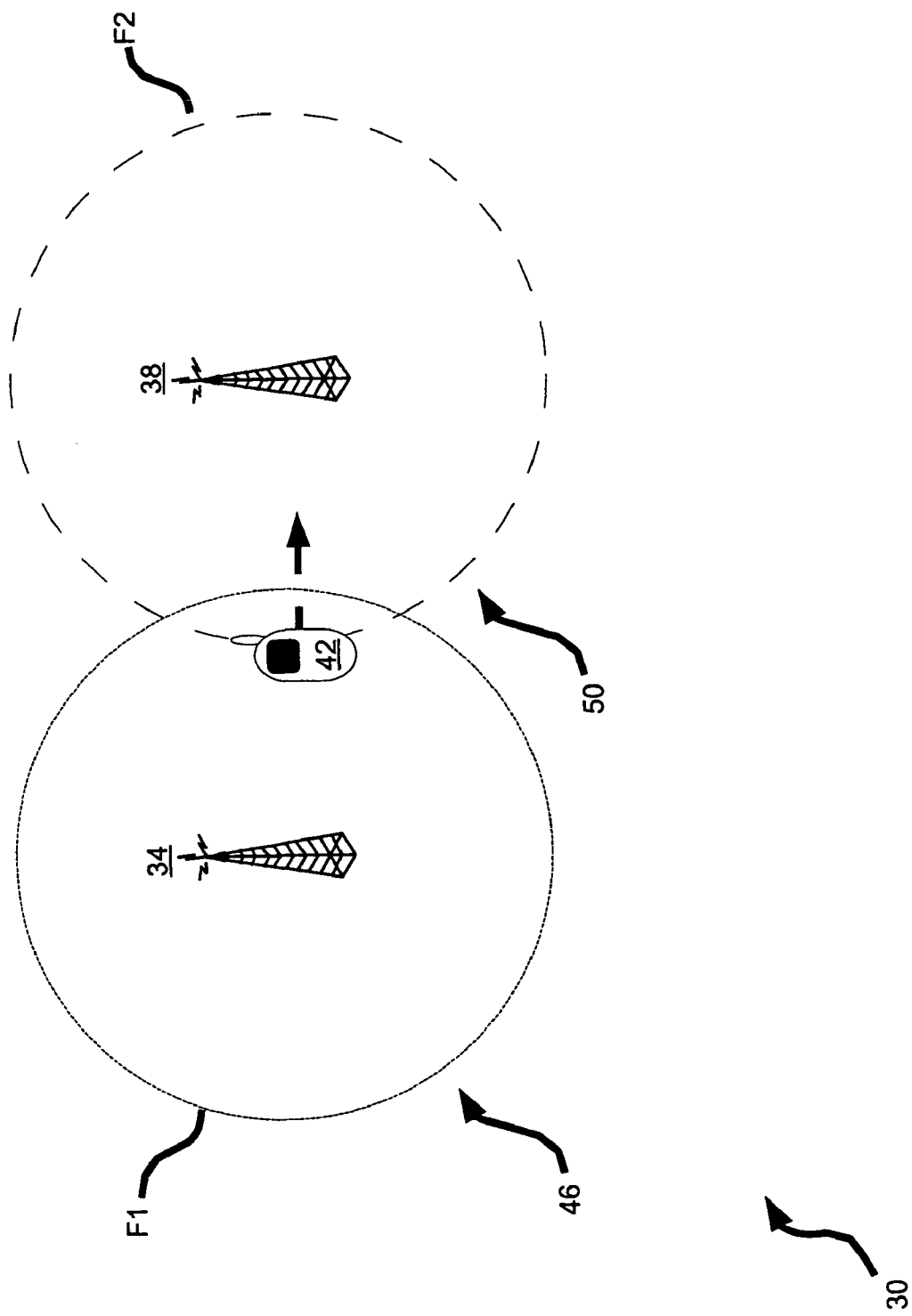
FIG. 1 is a system for effecting handoff in accordance with an embodiment of the invention.

Referring now to FIG. 1, a system for effecting handoff is indicated generally at 30. System 30 is comprised of at least two base stations 34 and 38 that are operating at different frequencies F1 and F2 such that a hard handoff is required when a subscriber station 42 moves from a coverage area 46 respective to base station 34 into a coverage area 50 respective to base station 38. It is to be understood that base stations 34 and 38 can actually represent a base station sector, and, in perhaps less common circumstances, base stations 34 and 38 can be two adjacent sector respective to a single base station.

In a present embodiment, system 30 is based on a CDMA standard, such as IS-95, J-STD-008 or CDMA 2000. Thus it is to be noted that, while dashed-lines are used to represent the different frequencies F1 and F2 of each base station 34 and 38, each base station 34 is in fact emitting a plurality of different channels within its coverage area that correspond to the CDMA standard being implemented, and thus each coverage area 46 and 50 reflects emitted traffic channels, pilot channels and the like from the respective base station 34 and 38. Further details on the emitted channels will be discussed in greater detail below.

In a present embodiment, base station 34 is a conventional CDMA base station familiar to those of skill in the art, while base station 38 is novel and enhanced base station.

Figure 2:
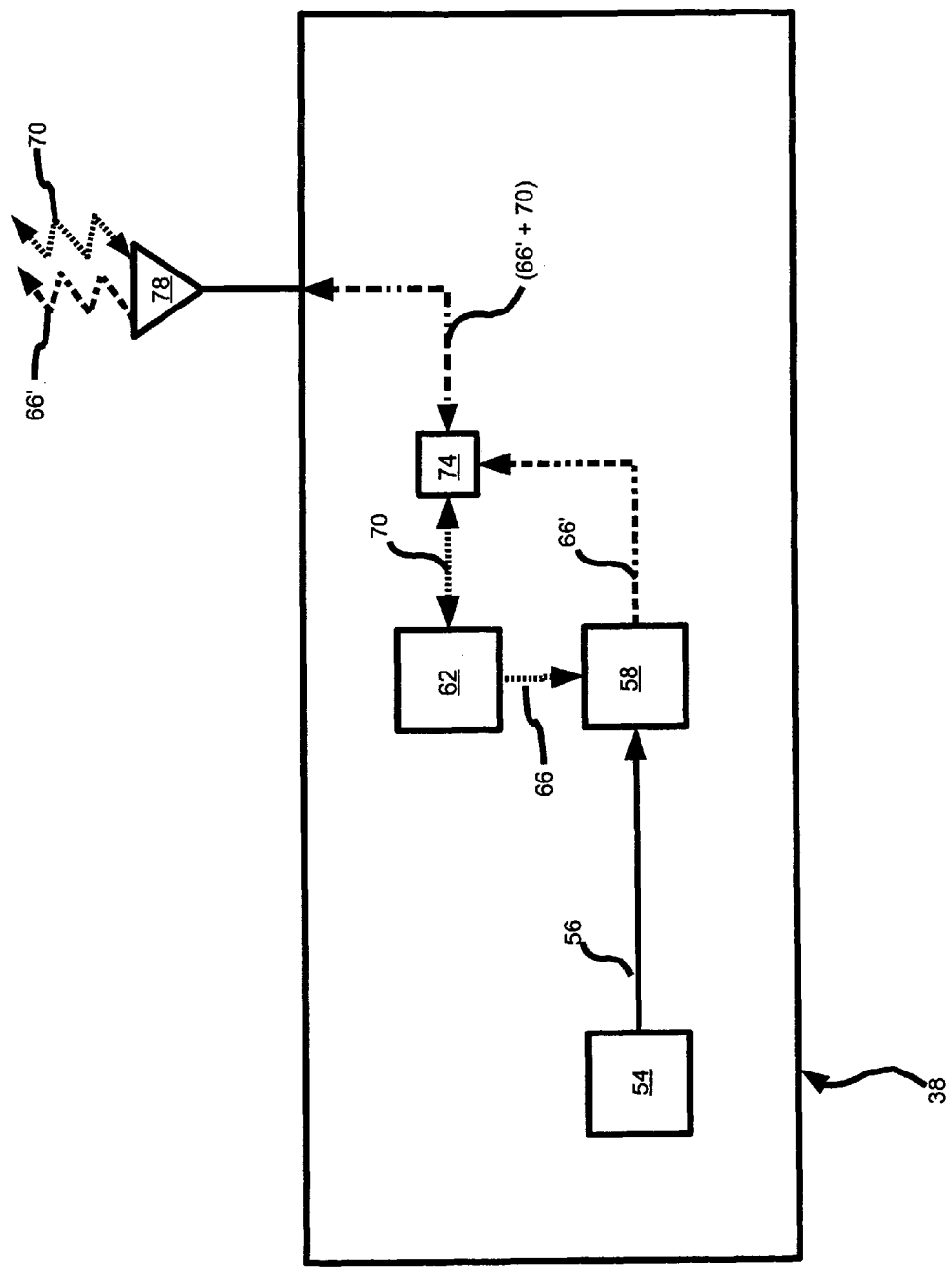
FIG. 2 is a block diagram representing the enhanced base station in FIG. 1.

Referring now to FIG. 2, a more detailed view of enhanced base station 38 is shown. Base station 38 includes a clock 54 which provides a clock signal input 56 to a converter 58. Because base station 38 is based on CDMA, clock 54 is typically a global positioning system ("GPS") receiver designed to provide a clock signal that allows converter 58 to synchronize itself with base station 34. Base station 38 also includes a radio 62, which in the present embodiment is a conventional CDMA base station radio. Radio 62 thus also generates a handoff trigger signal 66 at frequency F2. Handoff trigger 66 generated by radio 62 is thus also received by converter 58. (In a present embodiment, trigger signal 66 is simply a conventional CDMA signal, but it is to be understood that handoff signal 66 can be other types of signals depending on the particular system and in which the present embodiment is modified for deployment.) Where radio 62 is a conventional CMDA base station radio, as in the present embodiment, handoff trigger signal 66 can be obtained from a test output port on the radio as is found on many existing models of CMDA base station radios.

Radio 62 also transmits and receives its conventional CDMA signals 70, as are normally produced by radio 62, and therefore include traffic channels, pilot channel, etc.

Converter 58 is operable to convert handoff trigger signal 66 at frequency F2 into a converted handoff trigger signal 66', which is outputted from converter 58. Converted handoff trigger signal 66' and conventional CDMA signals 70 are thus combined at a power combiner 74, and then delivered to a base station antenna 78. Advantageously, base station antenna 78 can be simply the pre-existing antenna 78 already associated with base station 38. Base station antenna 78 thus transmits converted handoff trigger signal 66'.

In general, it should now be apparent that, in the present embodiment, enhanced base station 38 is simply a conventional CDMA base station 38 that has been retrofitted to include converter 58 and the appropriate connections thereto.

Figure 3:
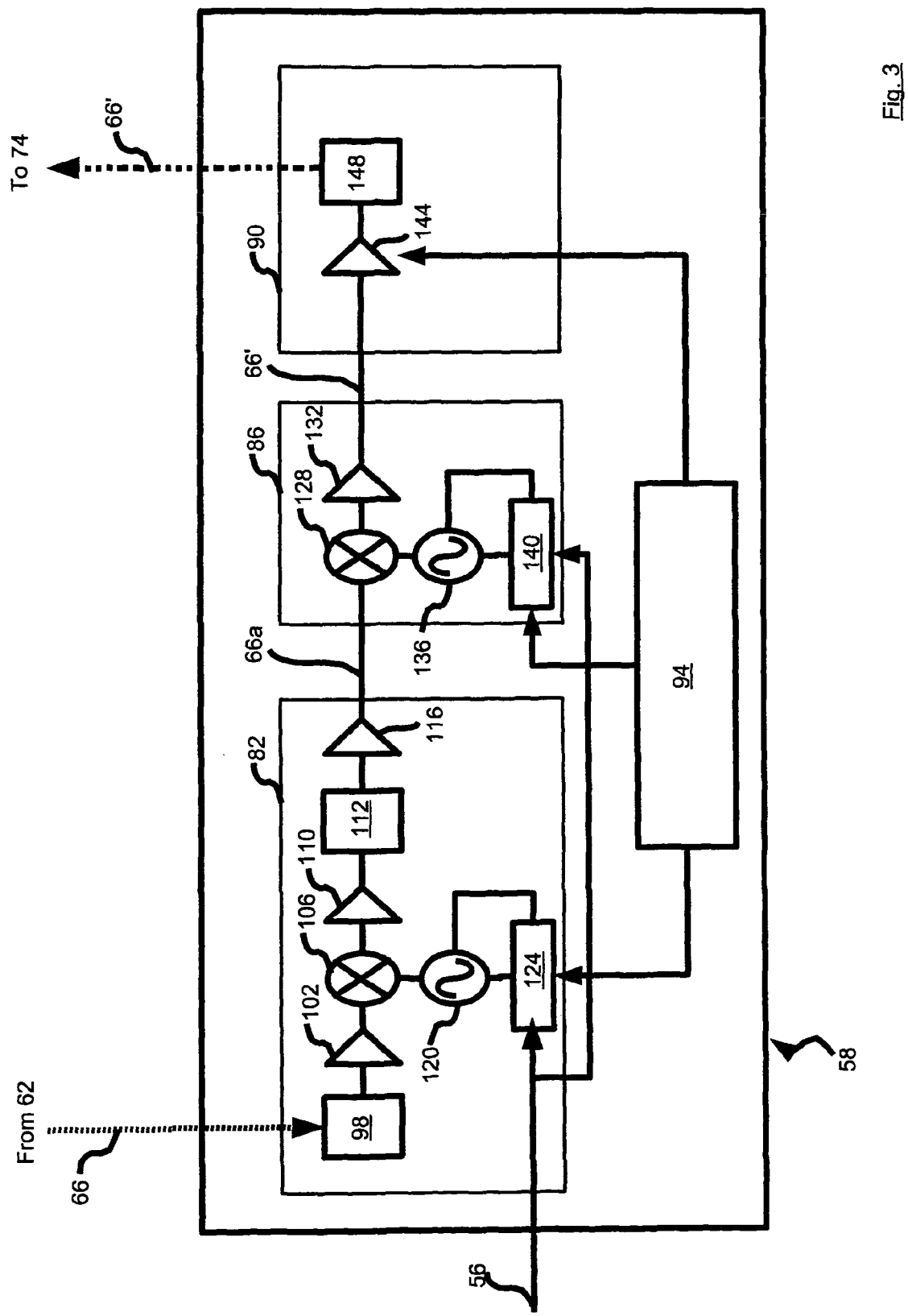
FIG. 3 is a block diagram of the converter shown in FIG. 2.

Referring now to FIG. 3, converter 58 is shown in greater detail. Converter 58 comprises a down-converter 82, an up-converter 86, a power amplifier 90 and a microcontroller 94. Down-converter 82 is operable to receive handoff trigger signal 66 and convert it down to an intermediate frequency ("IF") handoff signal 66a. In the present embodiment, down-converter 82 comprises a first bandpass filter 98, a first amplifier 102, a first mixer 106, a second amplifier 110, a second bandpass filter 112, and a third amplifier 116. The foregoing components (i.e. filter 98, amplifier 102, amplifier 110, bandpass filter 112, and amplifier 116) cooperate to convert handoff trigger signal 66 into intermediate handoff signal 66a. Down-converter 82 also includes an oscillator 120 and a phase locked loop 124. Phase locked loop 124 receives clock signal 56 and an input from microcontroller 94 instructing phase locked loop 124 as to the frequency (i.e. frequency F2) of handoff trigger signal 66. In turn, phase locked loop 124 via its connection through oscillator 120 connect to mixer 106, thereby providing the information needed to convert handoff trigger signal 66 and convert it down to an IF handoff signal 66a.

Up-converter 86 comprises a mixer 128, an amplifier 132, an oscillator 136 and a phase locked loop 140. Phase locked loop 140 is connected to microcontroller 94 to receive instructions as to which frequency that IF handoff trigger signal 66a is to be converted to (in this example, frequency F1). Thus, mixer 128 also receives IF handoff trigger signal 66a and mixes that signal with the input from oscillator 136. Amplifier 132 receives the output from mixer 128 thus ultimately converting IF signal 66a to CDMA re-direction signal 66'.

Both down-converter 82 and up-converter 86 ultimately use clock signal 56 to ensure that signal 66' is synchronized with base stations 34 and radio 62, as is common in CDMA systems.

Power amplifier 90 comprises an amplifier 144 and bandpass filter 148 to ultimately increase the power of signal 66', and thus converter 58 finally outputs signal 66' for delivery to power combiner 74.

Microcontroller 94, (which can be optional where the original frequency F2 and target frequency F1 are fixed), is thus typically connectable to a microcomputer (not shown), which allows a user to program microcontroller 94 as to which frequencies converter 58 is to operate with, and to indicate the level of gain to be used by amplifier 144. Microcontroller 94 also typically includes software and hardware to allow for logging of the operation of converter 58, and/or to generate alarms if certain events occur during the operation of converter 58 such as: the phase lock loops 124 and 140 losing their lock; the power is faulty in the power amplifier 90; the entire converter 58 fails to activate; the power supply used to power converter 58 is faulty; the temperature of converter 58 is outside safe operating ranges; the gain of amplifier 144 is out of range. Other alarms will occur to those of skill in the art. Such alarms can be delivered via a connector on microcontroller 94 (not shown) to a location remote from base station 38 so that a service technician can be called in to effect necessary repairs.

Figure 4:
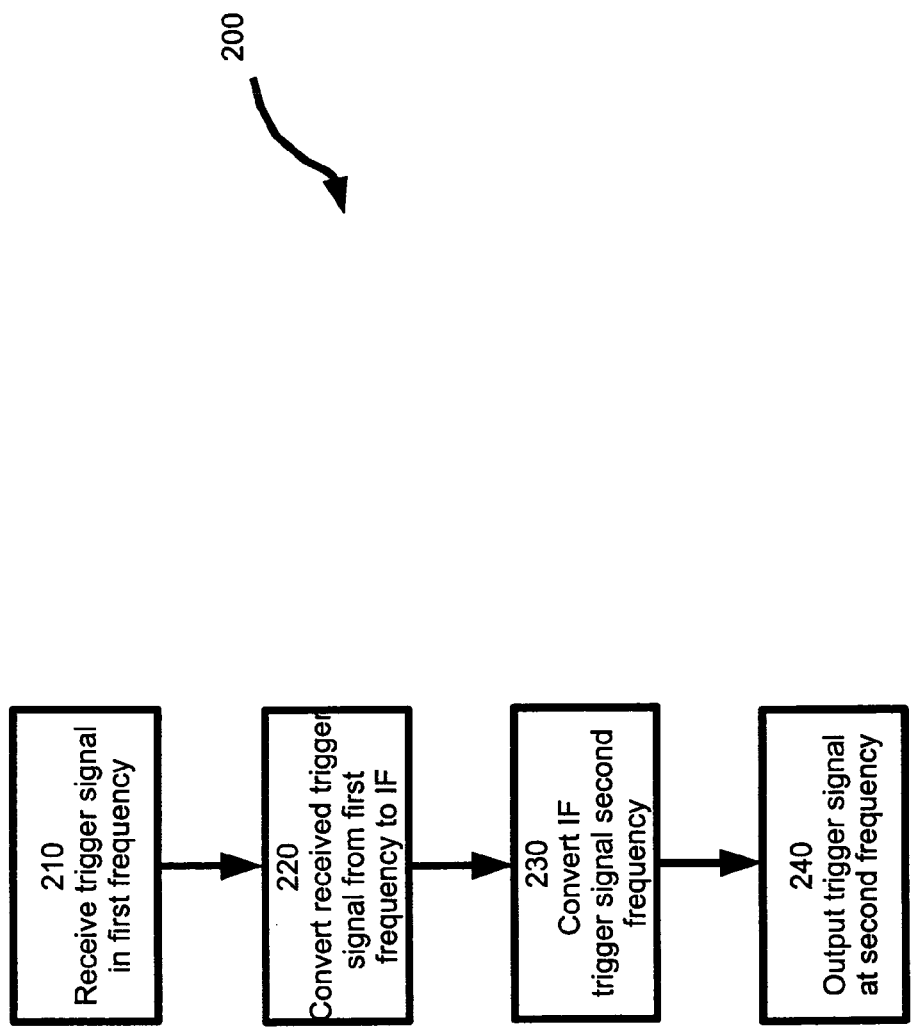
FIG. 4 shows a flow-chart depicting a method for generating a handoff trigger signal in accordance with another embodiment of the invention.

Referring now to FIG. 4, a method for generating a handoff trigger signal is indicated generally at 200. In order to assist in the explanation of the method, it will be assumed that method 200 is operated using converter 58. Furthermore, the following discussion of method 200 lead to further understanding of converter 58. (However, it is to be understood that converter 58 and/or method 200 can be varied, and need not work exactly as discussed herein in conjunction with each other, and that such variations are within the scope of the present invention.)

Beginning at step 210, a trigger signal at a first frequency is received. In converter 58, this occurs as trigger signal 66 originating from radio 62 is received at bandpass filter 98 of down converter 82. Next, at step 220, the received trigger signal is converted to base band signal. When implemented in converter 58, this step is performed by down converter 82, which processes CDMA signal 66 through the above-described components to generate an intermediate frequency CDMA signal 66a. Next, at step 230, the intermediate frequency CDMA signal is converted to the second frequency. When implemented in converter 58, this step is performed by up converter 86, which processes CDMA signal 66a through the above-described components to generate a converted CDMA re-direction signal 66'. Next, at step 240, the CDMA re-direction signal generated at step 230 is outputted. When implemented in converter 58, this step is performed at least in part by power amplifier 90 which boosts the power of trigger signal 66' to a desired level, before finally outputting signal 66' from converter 58 and delivering it to power combiner 74.

Figure 5:
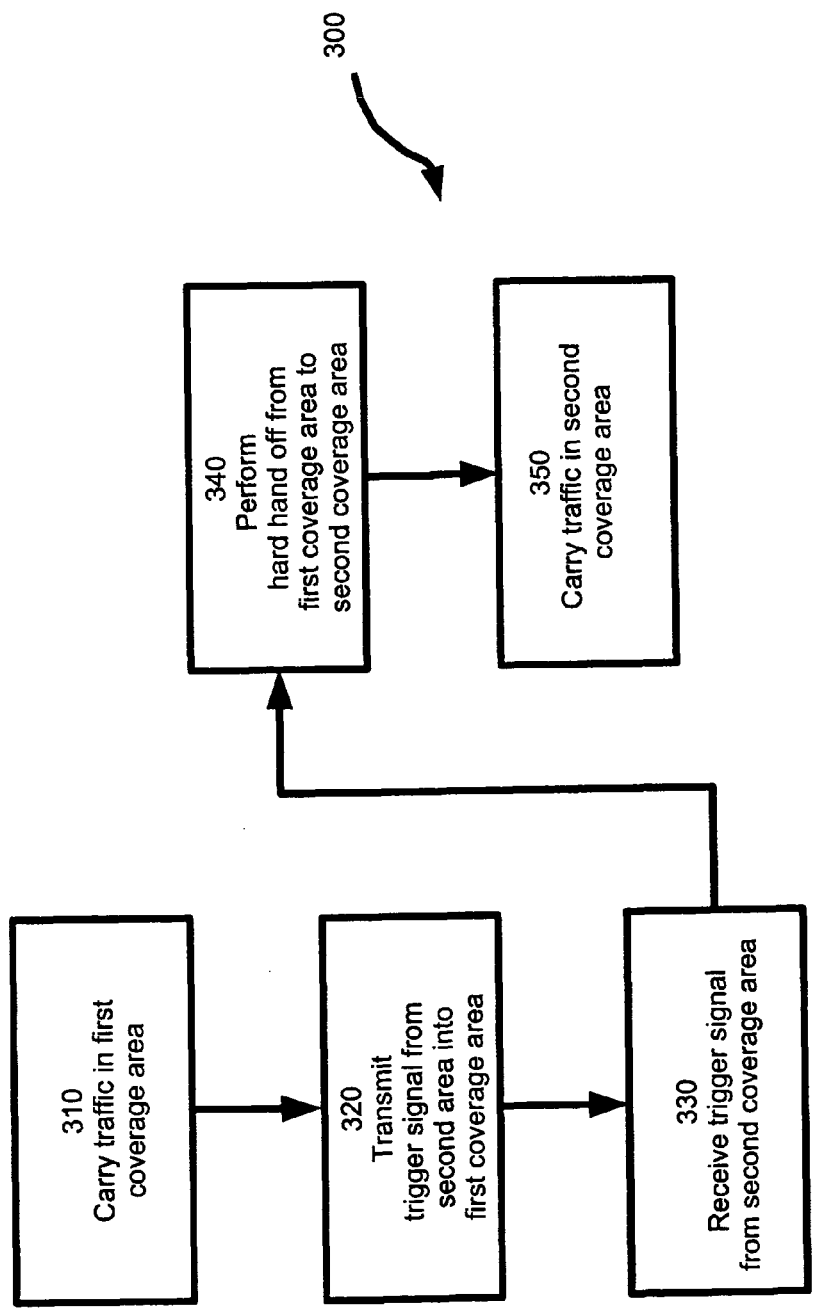
FIG. 5 shows a method of effecting a handoff in accordance with another embodiment of the invention.

Referring now to FIG. 5, a method for effecting traffic mode hard handoff is indicated generally at 300. In order to assist in the explanation of the method, it will be assumed that method 300 is operated using system 30. Furthermore, the following discussion of method 300 lead to further understanding of system 30. (However, it is to be understood that system 30 and/or method 300 can be varied, and need not work exactly as discussed herein in conjunction with each other, and that such variations are within the scope of the present invention.)

Method 300 is assumed to be performed while subscriber station 42 is operating within coverage area 46 in traffic mode. It is assumed that subscriber station 42 is operating at frequency F1 and is communicating with base station 34. It is further assumed that subscriber station 42 is located proximal to the intersection of coverage areas 46 and 50, and therefore just within range of base station 38. It is further assumed that subscriber station 42 is moving towards the outer periphery of coverage area 46, away from base station 34, and ultimately moving further towards the centre of coverage area 50.

Figure 6:
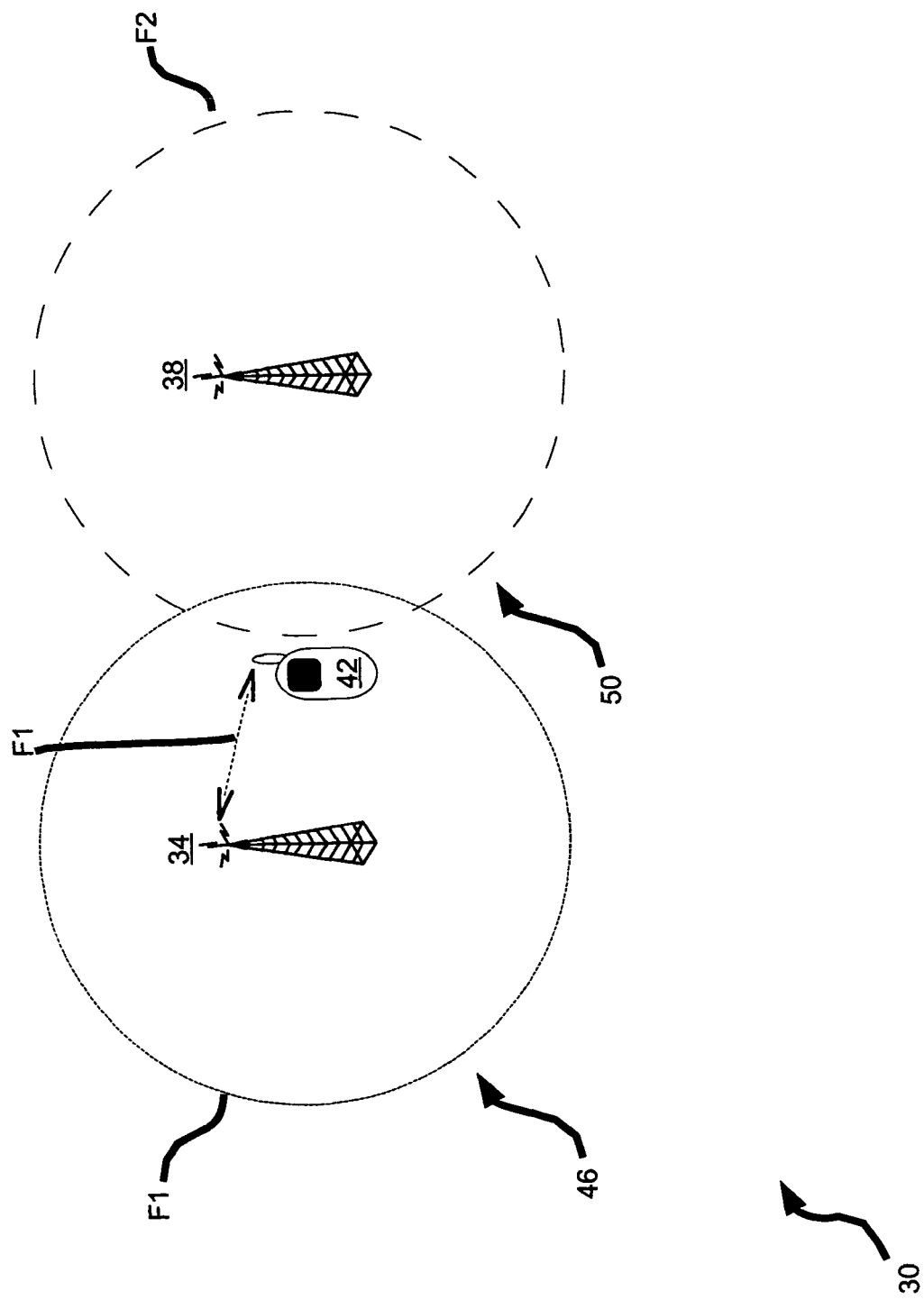
FIG. 6 shows the system of FIG. 1 and representing the performance of a step in the method of FIG. 5.
Figure 7:
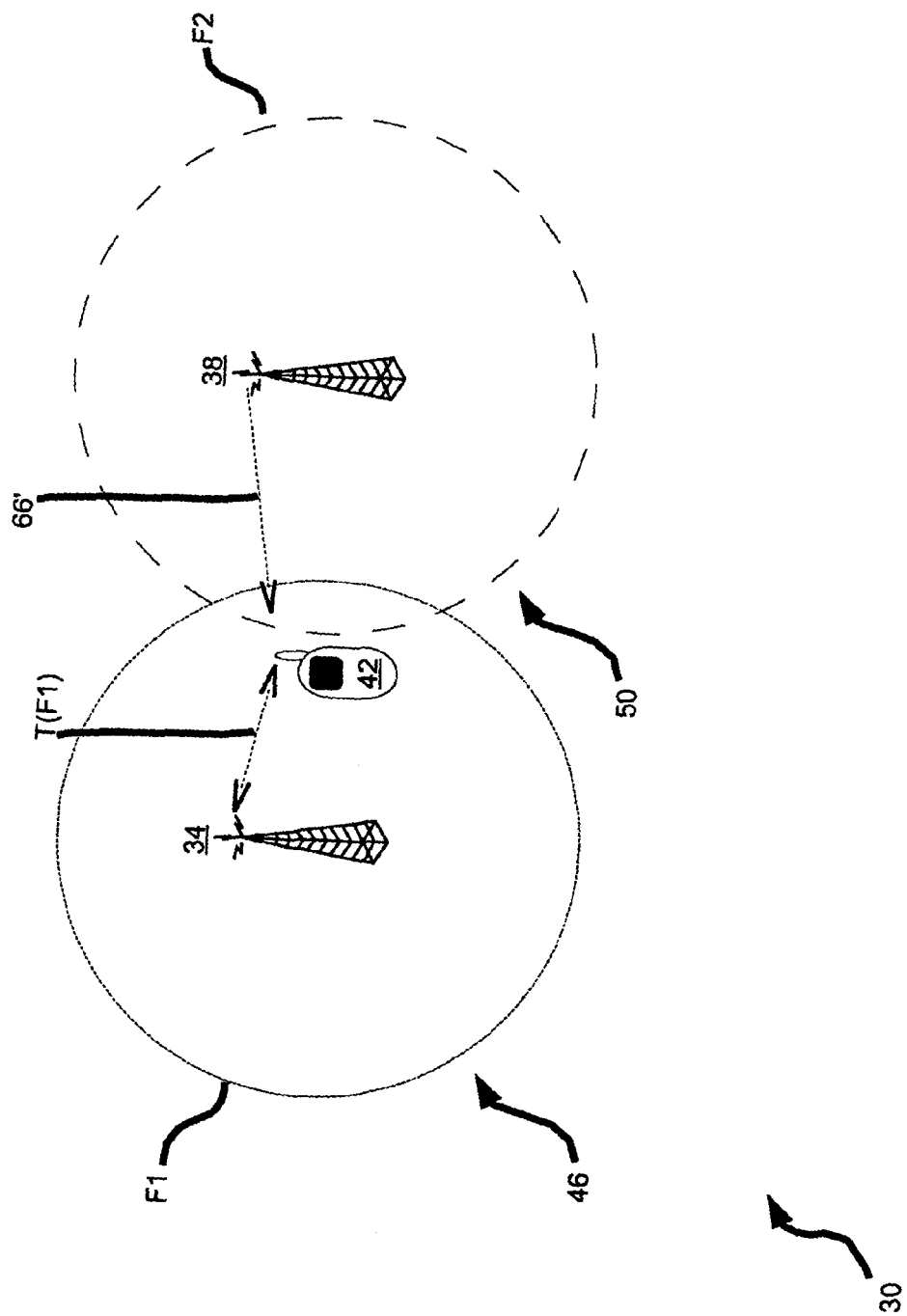
FIG. 7 shows the system of FIG. 1 and representing the performance of another step in the method of FIG. 5.

At step 310, traffic is carried in a first coverage area. Step 310 is represented in FIG. 6, where subscriber station 42 is located in coverage area 46, and is conducting a voice call (i.e. traffic) by means of a traffic channel established between subscriber station 42 and base station 34. The voice call in FIG. 7 is represented by reference T(F1), to indicate traffic being conducted at frequency F1.

At step 320, a trigger signal is transmitted from a second coverage area into the first coverage area (Step 320 is typically occurring on a continuous basis, and so it need not be construed that step 320 will only occur after step 310 has occurred.) Step 310 is represented in FIG. 7, wherein enhanced base station 38 is carrying on its own traffic with other subscriber stations (not shown) within coverage area 50 at frequency F2, while simultaneously transmitting CDMA re-direction signal 66' at frequency F1. Step 310 can be performed using method 200, or the like.

Figure 8:
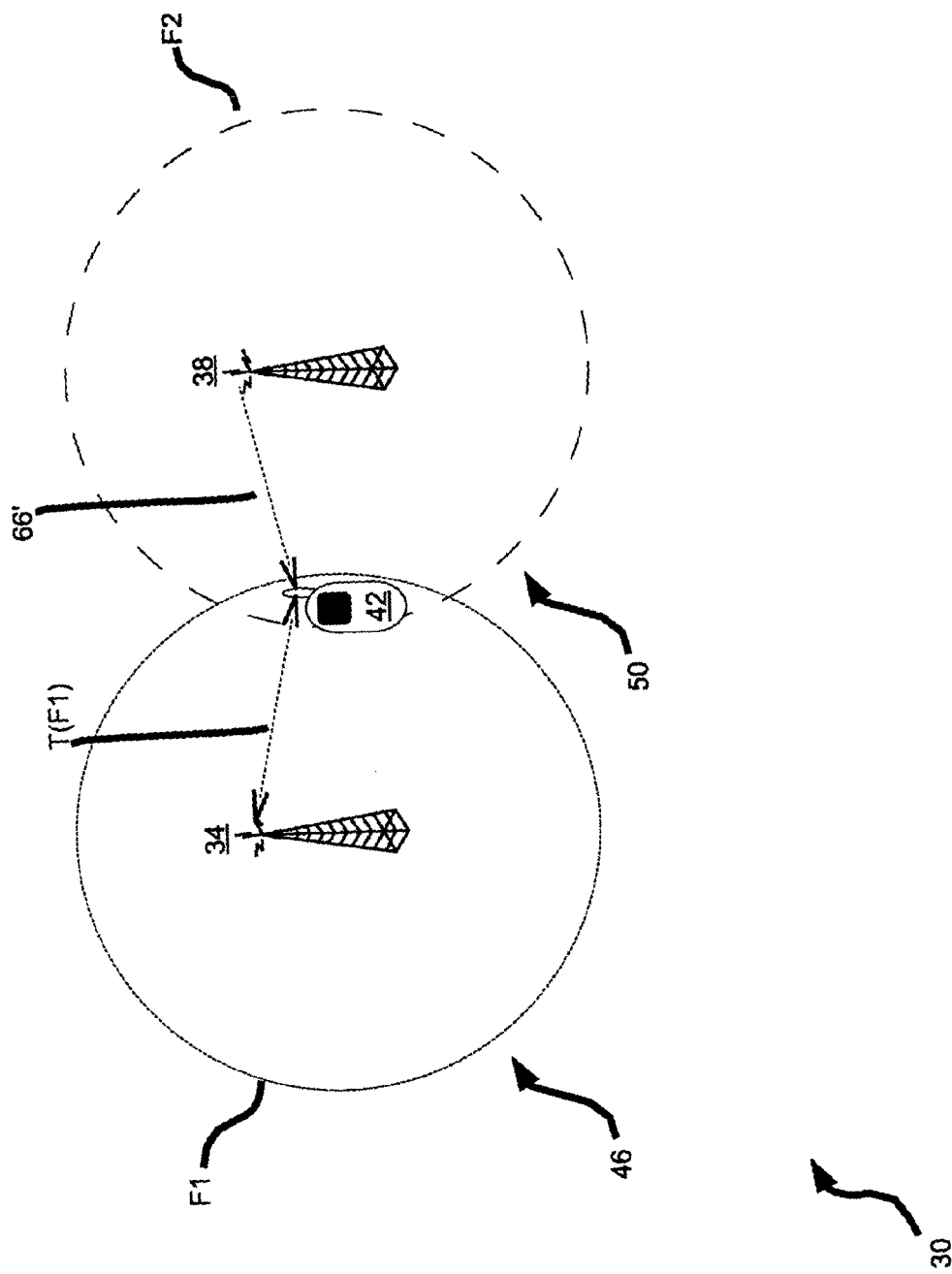
FIG. 8 shows the system of FIG. 1 and representing the performance of another step in the method of FIG. 5; and, FIG. 9 shows the system of FIG. 1 and representing the performance of another step in the method of FIG. 5.

At step 330, the handoff signal from the second coverage area is received in the first coverage area. Step 330 is represented in FIG. 8, where subscriber station 42 is shown as having moved into a region where coverage areas 46 and 50 overlap. Thus, at this point, while subscriber station 42 is communicating its voice call T(F1) with base station 34, it is also receiving beacon trigger signal 66' from base station 38, which is also being carried at frequency F1 and is therefore receivable by subscriber station 42 which is currently operating frequency F1 as it communicates with base station 38.

At step 340, hard handoff from the first coverage area (F1) to the second coverage area is effected (F2). In the present embodiment, now that the trigger for the hard handoff has been completed, the actual hard handoff effected at step 340 is, at this point, performed in substantially the same manner as a prior art pilot beacon triggered HHO, such as would occur in a system simply utilizing a pilot beacon unit, such as the Ericsson/Qualcomm QCPlus Pilot Beacon. Accordingly, the connection between subscriber station 42 and base station 34 is broken and re-established with base station 38 in the usual manner on F2.

Figure 9:
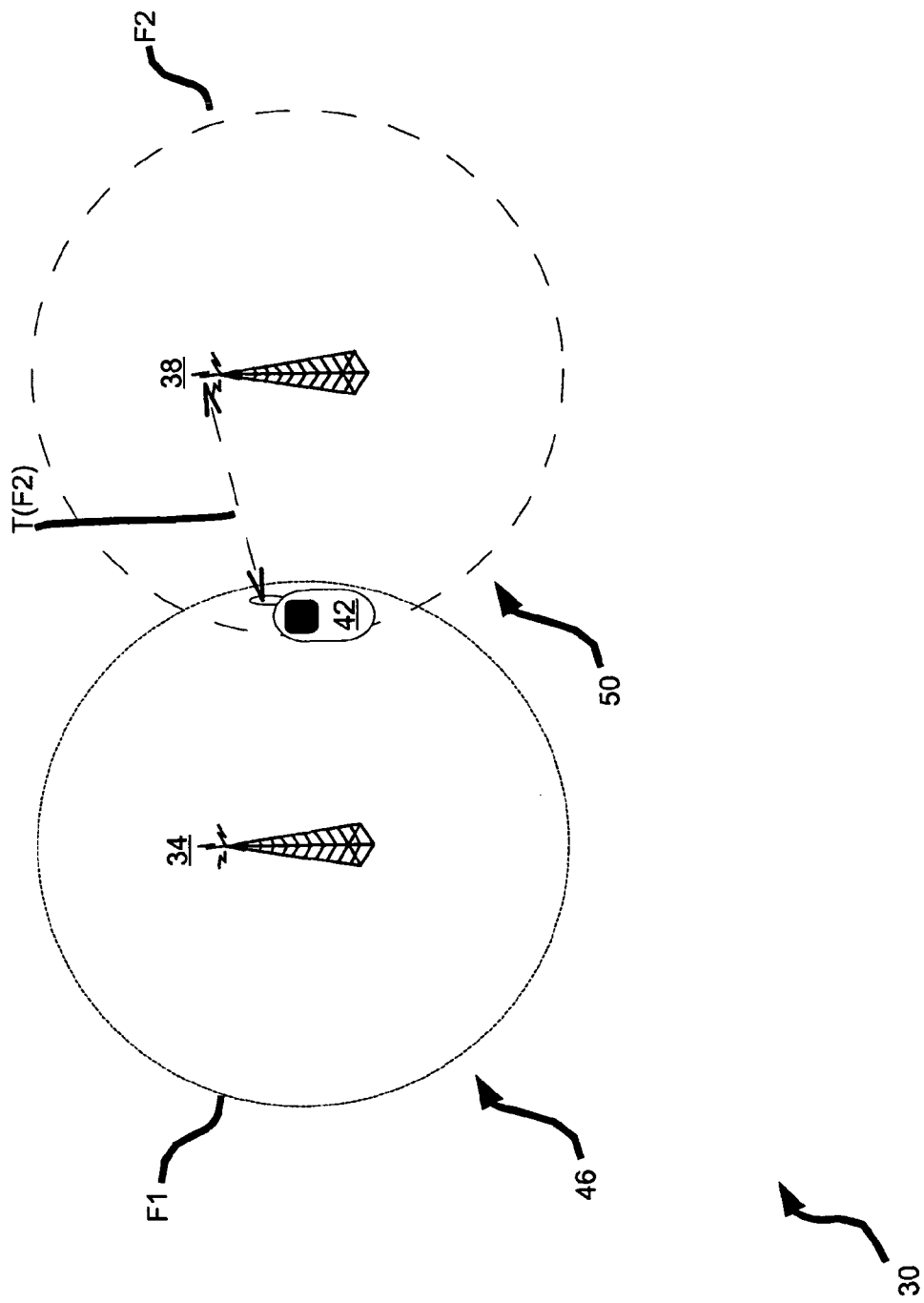

At step 350, traffic is carried in the second coverage area on F2. Step 350 is represented in FIG. 9, where subscriber station 42 is located in coverage area 50, and is conducting a voice call (i.e. traffic) by means of a traffic channel established between subscriber station 42 and base station 34. The voice call in FIG. 9 is represented by reference T(F2), to indicate traffic being conducted at frequency F2.

Of particular note about method 300, since the handoff described therein is conducted in traffic mode, then the handoff describe therein typically consists of a pilot beacon triggered hard handoff, and thus, handoff signal 66' is carried over the CDMA channels respective to that type of handoff.

However, it is also contemplated that the present invention is applicable to handoffs that occur in idle mode. In this event, the trigger signal is carried over the appropriate CDMA channel that is respective to that type of handoff. In particular, it is contemplated that the CDMA Channel List Message (carried over the paging channel) would be used to redirect subscriber station 42 from base station 34 to base station 38.

It is also to be noted that, while system 30 shows two adjacent coverage areas 46 and 50, the embodiments herein can be modified to manage handoffs where there are a plurality of adjacent coverage areas that are operating at different frequencies. Furthermore, where such a plurality of adjacent coverage areas occur yet the overlap of such coverage areas includes coverage areas that belong to different service providers, the embodiment herein can be modified to ensure that the subscriber station in question transitions to from one coverage area to another coverage that both belong to the same service provider.

While only specific combinations of the various features and components of the present invention have been discussed herein, it will be apparent to those of skill in the art that desired subsets of the disclosed features and components and/or alternative combinations of these features and components can be utilized, as desired. For example, while system 30 is primarily directed to carying voice signals, in other embodiments system 30 and its components can be varied to carry other types of signals, such as data signals, or voice over IP signals and/or combinations thereof. For example, system 30 can be modified to work with GSM, FDMA, TDMA, GPRS AMPS or other wireless protocols Also, while subscriber station 42 is a standard CDMA mobile handset, in other embodiments could also be a nomadic wireless subscriber station 42 capable of carrying voice and/or data, such as may be found in a fixed wireless system or wireless local loop.

Also, while converter 58 and method 200 discuss converting a first frequency to an intermediate frequency and then to a second frequency, it is contemplated that in other embodiments converter 58 can be configured to simply convert the first frequency directly to the second frequency. This could be particularly useful where the first frequency and second frequency are fixed, and therefore converter 58 need not be capable of dynamic adjustment as to the frequencies in which it will operate.

Furthermore, while in system 30 described above radio 62 is a conventional CDMA base station radio, in other embodiments radio 62 can simply be pilot beacon unit, such as the Ericsson/Qualcomm QCPlus Pilot Beacon. Where radio 62 is a pilot beacon unit, however, it will be understood that base station 38 is no longer acting as a base station, but merely as a unit for use in effecting hard handoff between other adjacent base stations operating at different frequencies.

It should also be understood that while converter 58 in enhanced base station 38 is shown to generate a single copy of trigger signal 66 as, in the present embodiment of system 30, a conventional CDMA re-direction signal 66', in other embodiment converter 58 can be configured to create multiple copies of CDMA signal 66, which can be particularly useful where converter 58 is operating at a boundary of multiple frequencies. In this case, a copy of CDMA signal 66 would be presented for each of the frequencies at the boundary, to encourage a hard handoff from one of those frequencies to the frequency of the original CDMA signal 66.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A device for integration into a base station of a type that includes at least one radio-transceiver for receiving and transmitting radio communications to a plurality of subscriber stations; the device comprising:
    an input device configured to be coupled to the at least one radio-transceiver for receiving a handoff signal from the at least one radio-transceiver at a first mode respective to a first coverage area of the communication system;
    an output device for delivering the handoff signal at a second mode respective to a second coverage area;
    a converter coupled to said input device and said output device for translating the handoff signal from the first mode into the second mode; the second mode handoff signal for indicating to a subscriber station operating in the second mode within both of the coverage areas to switch from the second mode to the first mode so that the subscriber station operates in the first mode;
    wherein said first mode is a first frequency and wherein said second mode is a second frequency different from said first frequency.

2. The device according to claim 1 wherein said first coverage area and said second coverage area of said system are each based on a respective protocol selected from the group consisting of CDMA, TDMA, GSM, GPRS, AMPS and FDMA.

3. The device according to claim 2 wherein said protocols respective to said coverage areas are different.

4. The device according to claim 1 wherein said handoff signal is a conventional CDMA re-direction signal, and wherein said first mode is a first frequency and said second mode is a second frequency different from said first frequency.

5. The device according to claim 4 wherein said first coverage area and said second coverage area are served by respective CDMA base stations.

6. The device according to claim 4 wherein said converter comprises a down-converter configured to receive said handoff signal from said input device and for converting said handoff signal from said first frequency to an intermediate frequency and an up-converter for converting said intermediate frequency to said second frequency.

7. The device according to claim 6 further comprising a microcontroller operably connected to said down-converter and said up-converter such that said first frequency and said second frequency is user-selectable.

8. The device according to claim 7 wherein said microcontroller is further configured to perform at least one of logging various conversions performed by said converter, and generating alarms upon occurrence of a pre-determined event.

9. The device according to claim 1 wherein said output device is configured to transmit said handoff signal to a base station power combiner for delivering said converted handoff signal to a base station antenna for outputting said handoff signal.

10. A base station that incorporates the device according to claim 1.

11. The base station according to claim 10 wherein the base station further comprises a base station power combiner and a base station antenna coupled to said base station power combiner for transmitting radio communications to a plurality of subscriber stations; said output device further configured to transmit said handoff signal to said base station power combiner.

12. The base station according to claim 10 wherein said first coverage area and said second coverage area of said system are each based on a respective protocol selected from the group consisting of CDMA, TDMA, GSM, GPRS, AMPS and FDMA.

13. The base station according to claim 12 wherein said protocols respective to said coverage areas are different.

14. The base station according to claim 10 wherein said handoff signal is a conventional CDMA re-direction signal.

15. The base station according to claim 14 wherein said base station is a first CDMA base station and said second coverage area is served by a second CDMA base station different from said first CDMA base station.

16. A method for generating a handoff signal at a base station of a type that includes at least one radio-transceiver for receiving and transmitting radio communications with respect to a plurality of subscriber stations, the method comprising:
receiving a handoff signal from the at least one radio-transceiver at a first mode respective to a first coverage area;
converting said handoff signal from said first mode to a second mode respective to a second coverage area; and, outputting said handoff signal into said second coverage area, the second mode handoff signal for indicating to a subscriber station operating in the second mode within both of the coverage areas to switch from the second mode to the first mode so that the subscriber station operates in the first mode;
wherein said first mode is a first frequency and wherein said second mode is a second frequency different from said first frequency.

17. The method according to claim 16 wherein said first coverage area and said second coverage area are each based on a respective protocol selected from the group consisting of CDMA, TDMA, GSM, GPRS, AMPS and FDMA.

18. The method according to claim 17 wherein said protocols respective to said coverage areas are different.

19. The method according to claim 16 wherein said handoff signal is a conventional CDMA re-direction signal, and wherein said first mode is a first frequency and said second mode is a second frequency different from said first frequency.

20. The method according to claim 19 wherein said first coverage area and said second coverage area are served by respective CDMA base stations.

21. The method according to claim 19 further comprising receiving an input signal identifying at least one said frequencies for use in performing a remainder of the steps.

22. The method according to claim 16 wherein outputting of said handoff signal comprises transmitting said handoff signal to a base station power combiner for delivering said converted handoff signal to a base station antenna for outputting said handoff signal into said second coverage area.

23. A system for performing handoff comprising:
a first base station operating at a first mode and comprising at least one radio-transceiver for receiving and transmitting radio communications to a plurality of subscriber stations; said at least one radio-transceiver configured to generate a handoff signal at said first mode;
a second base station operating a second mode;
a handoff device including an input device for receiving said handoff signal from said at least one radio-transceiver at said first mode; an output device for delivering said handoff signal at said second mode in a coverage area respective to said second base station; a converter coupled to said input device and said output device for translating the handoff signal from the first mode into the second mode; the second mode handoff signal for indicating to a subscriber station operating in the second mode within both of the coverage areas to switch from the second mode to the first mode;
wherein said first mode is a first frequency and wherein said second mode is a second frequency different from said first frequency.

24. The system according to claim 23 wherein said first base station and said second base station of said system are based on a protocol selected from the group consisting of CDMA, TDMA, GSM, GPRS, AMPS and FDMA.

25. The system according to claim 24 wherein said protocols respective to said coverage areas are different.

26. The system according to claim 23 wherein said handoff signal is a conventional CDMA re-direction signal, and wherein said first mode is a first frequency and said second mode is a second frequency different from said first frequency.

27. The system according to claim 26 wherein said converter comprises a down-converter configured to receive said handoff signal from said input device and for converting said handoff signal from said first frequency to an intermediate frequency and an up-converter for converting said intermediate frequency to said second frequency.

28. The system according to claim 27 further comprising a microcontroller operably connected to said down-converter and said up-converter such that said first frequency and said second frequency is user-selectable.

29. The system according to claim 28 wherein said microcontroller is further configured to perform at least one of logging various conversions performed by said converter, and generating alarms if said converter operates outside of desired specifications.

30. The system according to claim 23 wherein said first base station further comprises a base station power combiner and a base station antenna coupled to said base station power combiner for transmitting radio communications to a plurality of subscriber stations; said output device further configured to transmit said handoff signal to said base station power combiner.

31. A device for use in a wireless communication system comprising:

an input device coupled to a base-station radio-transceiver for receiving a handoff signal from said base-station radio-transceiver at a first mode respective to a first coverage area of the communication system;

an output device for delivering the handoff signal at at least one additional mode respective to at least one additional coverage area;

a converter for translating the handoff signal from the first mode into the at least one additional mode; the handoff signal for each of the at least one additional mode indicating to a subscriber station operating at the respective additional mode within the respective coverage area to switch from the respective additional mode to the first mode so that the subscriber station operates in the first mode;

wherein said first mode is a first frequency and wherein said second mode is a second frequency different from said first frequency.

32. A base station for use in a wireless communication system comprising:

a radio-transceiver for receiving and transmitting radio communications with respect to a plurality of subscriber stations;

data-processing equipment for carrying at least a portion of said communications over a backhaul; and a device for performing handoff comprising an input device for receiving a handoff signal from said radio-transceiver at a first mode respective to a first coverage area of the communication system; an output device for delivering the handoff signal at a second mode respective to a second coverage area; a converter coupled to said input device and said output device for translating the handoff signal from the first mode into the second mode; the second mode handoff signal for indicating to a subscriber station operating in the second mode within both of the coverage areas to switch from the second mode to the first mode so that the subscriber station operates in the first mode;

wherein said first mode is a first frequency and wherein said second mode is a second frequency different from said first frequency.

33. The base station according to claim 32 wherein said base station is based on the CDMA protocol.

34. The base station according to claim 32 wherein the radio-transceiver is configured to receive and transmit radio communications with respect to the plurality of subscriber stations in the first mode.

35. A handoff device for use in a wireless CDMA communication system and configured to be coupled to a radio-transceiver of a base station, the handoff device comprising an input device for receiving a CDMA re-direction signal from the radio-transceiver at a first frequency respective to a first coverage area of said communication system; a first converter connected to said input device for converting said CDMA re-direction signal from said first frequency to an intermediate frequency; a second converter connected to said first converter for converting said CDMA re-direction signal from said intermediate frequency to a second frequency; an output device connected to said second converter for delivering said CDMA re-direction signal at said second frequency within a second coverage area; said CDMA re-directional signal for indicating to a subscriber station operating in said second frequency and within both of said coverage areas to switch from said second frequency to said first frequency.

* * * * *